No. 60,395.

B. LOWE.
PISTON PACKING.

PATENTED DEC. 11, 1866.

Witnesses:
F. A. Jackson
Wm. Trevou

Inventor:
Burker Lowe
per
Munn & Co
Attorneys

United States Patent Office.

IMPROVEMENT IN PISTON-PACKING.

BARKER LOWE, OF FALL RIVER, MASSACHUSETTS.

Letters Patent No. 60,395, dated December 11, 1866.

The Schedule referred to in these Letters Patent and making part of the same.

TO ALL WHOM IT MAY CONCERN:

Be it known that I, BARKER LOWE, of Fall River, in the county of Bristol, and State of Massachusetts, have invented a new and improved Piston Packing; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
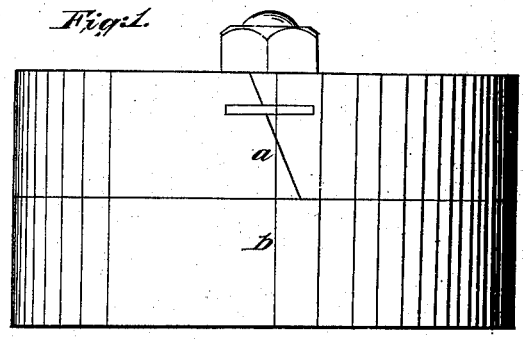
Figure 1 represents a side elevation of the piston.
Figure 2:
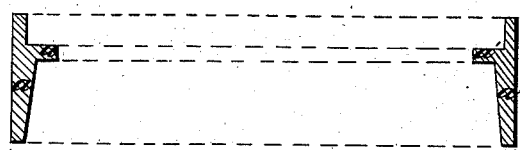
Figures 2 and 4 are sections of rings or casings detached.
Figure 3:
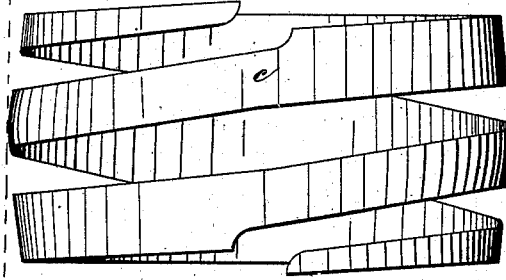
Figure 3 is an elevation of the spiral spring detached.
Figure 4:
Figure 5:
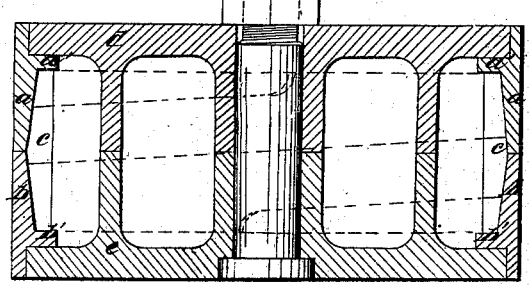
Figure 5 is a section of the piston, when the same is complete.

This invention relates to a piston packing, in which a spiral spring is used, which is bevelled off from the centre towards both ends, so that the operation of inserting the spring in its place is greatly facilitated. The rings which surround the spring are so formed that they encase the head and follower of the piston, and they are provided each with an internal flange, which is surfaced to the inner surface of the head or follower in such a manner that the escape of steam is prevented, and the head and follower are not allowed to come in contact with the cylinder. The head $e$ and the follower $d$ of my piston are both encased by the rings $a$ $b$, which are provided with internal flanges $a'$ $b'$, as clearly shown in the drawing. These flanges are surfaced to the inner surfaces of the head and follower, whereby the escape of steam is prevented, and by the rings, the head and follower of the piston are protected, and all the friction caused by said parts coming in contact with the cylinder (particularly in horizontal cylinders) is avoided. The outer rings form the only bearing surfaces, thus taking all the weight off the two narrow edges of the head and follower, and causing the whole piston to rest on the outer rings, which, when worn out, can be readily replaced, the head and follower being protected from all wear. The rings $a$ $b$ are expanded both laterally and vertically by the spiral spring $c$, which is bevelled off from the centre towards both ends, as shown in fig. 3, so that the same can be readily introduced in its place. Said spring bears on the flanges $a'$ $b'$ of the rings, and keeps them in contact with the head and follower of the piston, and at the same time it expands the rings, and keeps them in intimate contact with the inner surface of the cylinder, and furthermore, by compressing the springs endways, its diameter must enlarge, and consequently, by screwing down the follower, the spring is caused to bear against the rings with a uniform pressure all round and a perfectly steam-tight packing is obtained, which can be easily handled.

What I claim as new, and desire to secure by Letters Patent, is—

The rings $a$ $b$, encasing the head and follower, and provided with the flanges $a'$ $b'$, in combination with the bevelled spiral spring $c$, constructed as described, substantially as and for the purpose specified.

BARKER LOWE.

Witnesses:
B. F. WINSLOW,
HENRY BAGSHAW.